Jan. 24, 1967  R. GAUTHIER  3,299,824
ROTARY LIQUID METERING PUMPS, IN PARTICULAR FOR THE FEED
OF FUEL INJECTION PUMPS
Filed July 8, 1965  2 Sheets-Sheet 1

INVENTOR
ROBERT GAUTHIER
BY
Bailey, Stephens & Huettig
ATTORNEYS

United States Patent Office 3,299,824
Patented Jan. 24, 1967

3,299,824
ROTARY LIQUID METERING PUMPS, IN PARTICULAR FOR THE FEED OF FUEL INJECTION PUMPS
Robert Gauthier, St-Germain-au-Mont-d'Or (Rhone), France, assignor to Societe Industrielle Generale de Mecanique Applique S.I.G.M.A., Paris, France
Filed July 8, 1965, Ser. No. 470,373
Claims priority, application France, July 15, 1964, 981,741
1 Claim. (Cl. 103—120)

The present invention relates to rotary pumps including at least one rotary part disposed inside a casing having two walls transverse with respect to the axis of rotation of said part, which is normally in sliding contact with said walls so as to limit therewith pumping chambers having a periodically variable volume. The invention is more especially intended for pumps of this type serving to feed fuel to internal combustion engine injection pumps and in particular to injection pumps having a rotary distributing valve.

The object of the present invention is to provide a rotary pump of this type such that its delivery flow rate does not exceed a given maximum value, whatever be the speed at which it is driven.

The essential feature of the present invention consists in providing, in the delivery circuit of the pump a calibrated orifice or other throttling part capable of causing the delivery pressure to increase upstream of this orifice, and in particular in those of the pumping chambers that cooperate with the delivery circuit, as the delivery flow rate of the pump increases and in making at least one of the above mentioned transverse walls movable automatically away from the rotary element or elements of the pump, against the action of resilient means, under the action of the liquid pressure in the above mentioned pump chambers when this pressure exceeds a predetermined limit corresponding to a predetermined delivery rate, which causes the excess of delivered liquid to be evacuated.

A preferred embodiment of the present invention will be hereinafter described with reference to the appended drawings, given merely by way of example, and in which.

Figure 1:
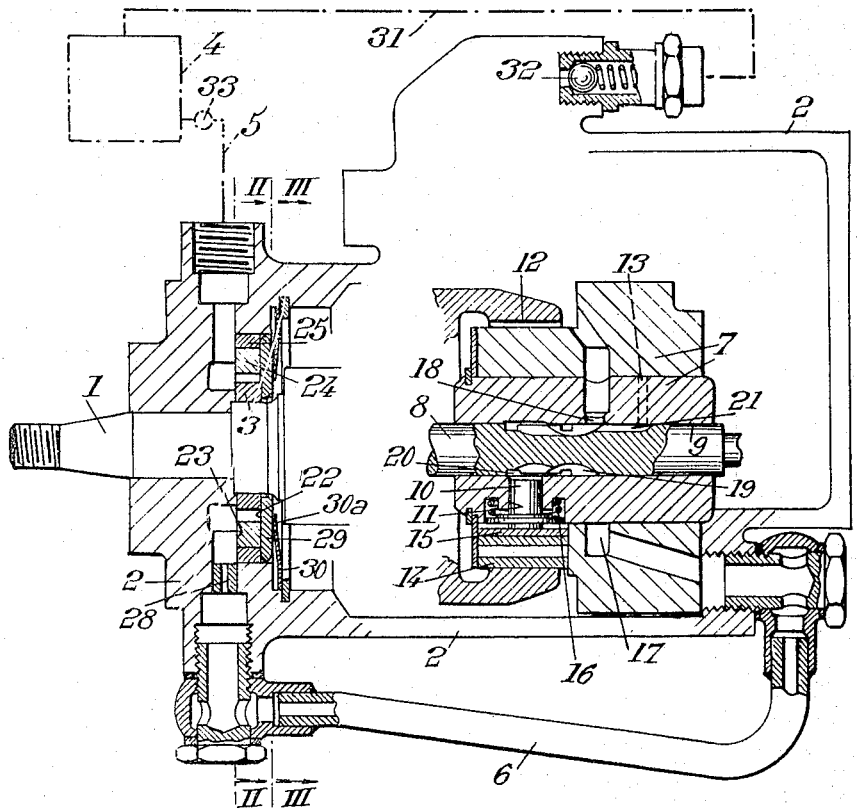
FIG. 1 is a diagrammatic axial sectional view of the whole of a distributing valve injection pump and of its rotary feed pump, the latter being made according to the present invention.

The fuel injection system illustrated by the drawings includes a driving shaft 1 journalled in a casing 2 and connected with the shaft of the internal combustion engine to be fed with fuel by the injection pump, and a feed pump including at least one rotary part 3 fixed on said shaft 1, which feed pump sucks in the fuel from a tank 4 through a conduit 5 and delivers it through a conduit 6 toward the fuel injection pump.

This fuel injection pump includes a fixed body 7 and a distributing valve 8 driven in rotation by shaft 1. This distributing valve 8 is journalled in a bore 9 provided in fixed body 7. Two opposed pump pistons 10, only one of which is visible on FIG. 1, are slidable in a bore 11 substantially perpendicular to the common axis of distributing valve 8 and of shaft 1, under the action of an annular cam 12 including as many inward projections as the internal combustion engine includes cylinders. Body 7 is provided with equidistant channels 13 leading to the respective injectors (not shown) of the engine and which communicate with the pump bore 11. Annular cam 12 is carried by shaft 1 and pump pistons 10 by body 7. Said cam 12 acts in the centripetal direction upon piston 10 through rollers 14 and reciprocating members 15, pistons 10 being urged in the centrifugal direction by springs 16.

Conduit 6 communicates permanently, through an annular groove 17, with equidistant radial holes 18 the number of which is equal to the number of cylinders of the engine and which open into bore 9 through a longitudinal groove 19 provided in distributing valve 8. This longitudinal groove 19 opens into a peripheral groove 20 provided in said distributing valve 8 so as to communicate permanently with the pump bore 11.

The delivery circuit of said bore 11 comprises a second longitudinal groove 21 starting from groove 20 and leading to distribution channels 13.

It is known that such an injection pump works as follows. When shaft 1 rotates together with cam 12, pistons 10 are pushed alternately toward the outside (suction) under the action of springs 16 and toward the inside (delivery) when their rollers 14 are pushed by the projections of cam 12. During suction, fuel, kept under pressure in groove 17 by the feed pump including rotary part 3 and by check valve 32 (which will be hereinafter referred to), passes through holes 18 located opposite grooves 19 and 21 and comes to fill up the volume left free in bore 11 by pistons 10. During delivery, fuel is driven into annular groove 20 and longitudinal grooves 19 and 21. Injection takes place through groove 21 and channel 13, with which this groove communicates whereas grooves 19 and 21 are out of communication with holes 18.

Figure 2:
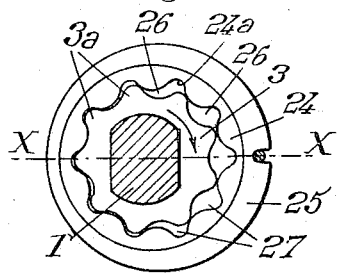
FIGS. 2 and 3 are sectional views on the lines II—II and III—III of FIG. 1, respectively.

The feed pump has its rotary part 3 disposed inside a chamber including two side walls 22 and 23 transverse to the axis of shaft 1. Normally, rotary part 3 is in sliding contact with said walls 22 and 23 to limit therewith pump chambers having periodically varying volumes. According to the preferred embodiment of the invention, illustrated by the drawings, the feed pump is a rotary pump of the type including internally meshing rotors with $n$ and $n + 1$ lobes respectively. It comprises inner rotor 3, outer rotor 24 and a stationary eccentric casing 25. Outer rotor 24 is provided with a number of pump chambers 24a greater by one unit than the number of pumping chambers 3a of the inner rotor 3. These pumping chambers, which are limited laterally by said walls 22 and 23 and radially by inner rotor 3 and outer rotor 24 form, on opposite respective sides of axis X—X passing through the respective centers of the rotors, suction chambers 26 and delivery chambers 27 (FIG. 2).

As above stated, said feed pump is intended to suck in fuel from tank 4, generally across a filter (not shown), to feed it to groove 17 under a given pressure and, when the fuel has lubricating properties, to scavenge the elements contained in casing 2. The pumps known up to the present time, whether they are blade pumps, gear pumps, or rotary pumps with two meshing rotors, have the drawback that their delivery is excessive at high speeds of rotation (which leads to providing filters and pipes of greater dimensions that it would be necessary) but is insufficient at low speeds.

The chief object of the present invention is to obviate this drawback.

For this purpose, there is provided, in the delivery circuit of the feed pump a calibrated orifice 28 adapted to produce a rise of the delivery pressure upstream of said orifice (and in particular in delivering chambers 27) and transverse wall 22 is so arranged as to be moved automatically away from the rotary elements 3 and 24 of the feed pump, against the action of resilient means, under the action of the pressure existing in delivery pump chambers 27 when this pressure, which varies in the same manner as the delivery rate, exceeds a predetermined limit.

Figure 3:
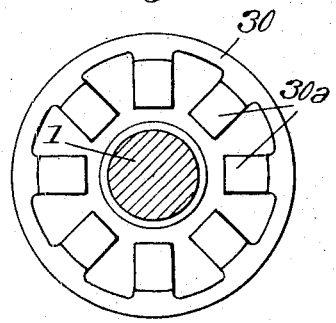

As shown by the drawings, fixed wall 23 is constituted by the wall of casing 2 through which shaft 1 extends, whereas movable wall 22 consists of one of the faces of a plate 29 urged by resilient means toward the left. Said resilient means consist of a washer 30, made of spring steel, provided with resilient bent projections 30a (FIG. 3). Shaft 1 extends through this plate 29. The peripheral profile of plate 29 is in cross section in the shape of a circular arc, as shown by FIG. 1, which prevents it from wedging when it is displaced. In order to improve liquid-tightness for low speeds of rotation, the three parts 3, 24 and 25 are advantageously machined together so as to have exactly the same thickness, whereby plate 29 can thus bear thereon uniformly.

There is further provided an overflow conduit 31 extending between casing 2 and tank 4, this conduit being provided with a spring check valve 32 intended to maintain a given counter-pressure on the inside of the casing. Finally, for priming purposes, a hand pump 33 is provided on suction conduit 5.

This feed pump works as follows:

Orifice 28 causes the delivery pressure to vary in accordance with the speed of rotation of shaft 1. When the flow rate of the feed pump is below a given limit, resilient washer 30 applies plate 29 in a fluidtight manner against parts 3, 24 and 25 and the whole of the delivery passes through conduit 6. When, on the contrary, this flow rate is above said limit, the pressure upstream of calibrated orifice 28 and in particular in pump chambers 27 is sufficient to overcome the pressure of resilient washer 30. Plate 29 therefore moves toward the right and, through the clearance thus produced, the excess of the flow rate returns to chambers 26. The counter-pressure maintained by check valve 32 acts in the same direction as spring 30 and therefore permits of considerably reducing the importance thereof. Thus the feed pump according to the invention has a first advantage which is to have its delivery well adapted to all conditions of operation.

Figure 4:
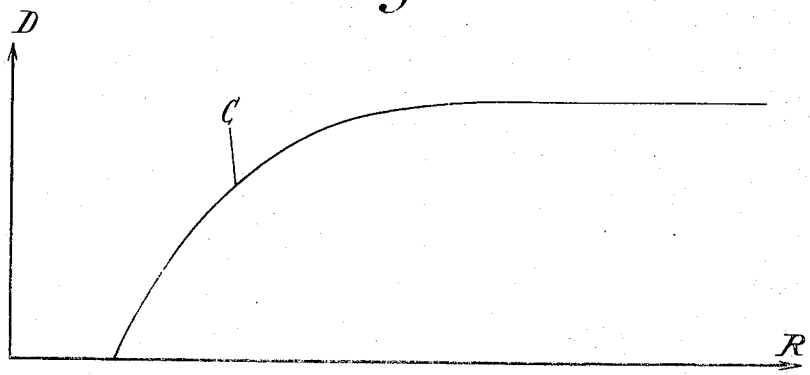
FIG. 4 shows a curve illustrating the operation of said feed pump.

FIG. 4 shows a curve C the abscissas of which represent the number of revolutions per minute R and the ordinates the rate of flow per hour D, in liters, the flow rate first increasing and subsequently becoming substantially constant.

Another advantage is that the feed pump is permeable to the limit delivered by the priming pump 33, which permits of filling up the inside of casing 2 without it being necessary to have shaft 1 revolving. In the absence of counter pressure in the casing, plate 29 then moves away from pieces 3, 24 and 25 without difficulty.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claim.

What I claim is:

A fuel injection device which comprises, in combination,
 a fuel injection pump having an inlet and delivery channels,
 a check valve communicating with said inlet, and a feed pump comprising:
 a rotary part movable about an axis,
 a casing for said rotary part including two walls transverse to said axis and adapted to cooperate with said rotary part, which is normally slidable along said walls for limiting therewith pump chambers of cyclically varying volumes, at least one of said walls being movable away from said rotary part,
 resilient means for urging said last mentioned casing wall toward said rotary part,
 an inlet conduit leading to said casing,
 a delivery conduit leading to said fuel injection pump inlet,
 and means forming a calibrated orifice in said delivery conduit for increasing the liquid pressure upstream of said calibrated orifice and in particular in those of said pump chambers that are temporarily in communication with said delivery conduit.

References Cited by the Examiner

UNITED STATES PATENTS

| | | | |
|---|---|---|---|
| 106,581 | 8/1870 | Heald et al. | 103—113 |
| 111,026 | 1/1871 | Williams | 103—113 |
| 2,346,761 | 4/1944 | Johnson | 103—126 |
| 2,383,153 | 8/1945 | Parsons | 103—126 |
| 2,531,335 | 11/1950 | Harvey | 103—126 |
| 2,571,377 | 10/1951 | Olah | 103—126 |
| 2,660,259 | 11/1953 | Morehouse | 103—126 |
| 2,742,862 | 4/1956 | Banker | 103—126 |
| 2,809,655 | 10/1957 | Wood | 103—126 |
| 2,865,301 | 12/1958 | Thomas | 103—126 |
| 2,881,704 | 4/1959 | Murray | 103—126 |
| 2,915,977 | 12/1959 | Campbell | 103—126 |

DONLEY J. STOCKING, *Primary Examiner.*

WILBUR J. GOODLIN, *Examiner.*